US011825958B2

(12) United States Patent
Tong

(10) Patent No.: US 11,825,958 B2
(45) Date of Patent: Nov. 28, 2023

(54) CONNECTING STRUCTURE BETWEEN FEET AND CENTRAL MEMBER, FEET, CENTRAL MEMBER, CHASSIS AND CHAIR

(71) Applicant: Zhejiang Yuyue Furniture Co., Ltd., Huzhou (CN)

(72) Inventor: Baijun Tong, Huzhou (CN)

(73) Assignee: Zhejiang Yuyue Furniture Co., Ltd., Huzhou (CN)

( * ) Notice: Subject to any disclaimer, the term of this patent is extended or adjusted under 35 U.S.C. 154(b) by 384 days.

(21) Appl. No.: 17/273,002

(22) PCT Filed: Jul. 14, 2020

(86) PCT No.: PCT/CN2020/101834
§ 371 (c)(1),
(2) Date: Mar. 3, 2021

(87) PCT Pub. No.: WO2021/012988
PCT Pub. Date: Jan. 28, 2021

(65) Prior Publication Data
US 2021/0321777 A1    Oct. 21, 2021

(30) Foreign Application Priority Data
Jul. 23, 2019   (CN) .......................... 201910666597.6

(51) Int. Cl.
*A47C 7/00* (2006.01)
*F16B 12/10* (2006.01)
*F16B 12/44* (2006.01)

(52) U.S. Cl.
CPC .............. *A47C 7/004* (2013.01); *F16B 12/10* (2013.01); *F16B 12/44* (2013.01)

(58) Field of Classification Search
CPC .......... A47C 7/004; F16B 12/10; F16B 12/44; F16B 12/48; F16B 21/086; F16B 2200/40;
(Continued)

(56) References Cited

U.S. PATENT DOCUMENTS

| | | | |
|---|---|---|---|
| 7,314,252 B2 * | 1/2008 | Ohliv | A47C 7/004 248/188.7 |
| 9,144,315 B1 | 9/2015 | Cheng | |

(Continued)

FOREIGN PATENT DOCUMENTS

| | | | | |
|---|---|---|---|---|
| CN | 201509927 U | 6/2010 | | |
| CN | 201782355 U * | 4/2011 | ............. | A47C 7/004 |

(Continued)

OTHER PUBLICATIONS

PCT Search Report for corresponding PCT Patent Application No. PCT/CN2020/101834.

(Continued)

*Primary Examiner* — Josh Skroupa
(74) *Attorney, Agent, or Firm* — Olive Law Group, PLLC

(57) ABSTRACT

A connecting structure for connecting support feet and a center piece, a support foot, a center piece, a chassis and a seat are provided. The connecting structure for connecting support feet and a center piece includes: center piece connecting portions provided on the outer periphery of the center piece for connecting with the support feet; support foot connecting portions provided on one end of the support feet for connecting with the center piece. Two side walls of each of the center piece connecting portions are further provided with rotation limit grooves, with a clamping platform arranged inside; two side surfaces of the support foot connecting portion are respectively provided with rotation (Continued)

limit protrusions outwardly protruding, an abutting portion is provided on the lower surface.

11 Claims, 6 Drawing Sheets

(58) Field of Classification Search
CPC .... F16C 11/10; F16C 2314/73; Y10S 403/11; Y10S 403/13; Y10T 403/32254; Y10T 403/32262; Y10T 403/32442; Y10T 403/32549; Y10T 403/32557; Y10T 403/60
USPC .... 403/83, 84, 106, 112, 113, 326, DIG. 11, 403/DIG. 13; 248/188.7
See application file for complete search history.

(56) References Cited

U.S. PATENT DOCUMENTS

| | | | |
|---|---|---|---|
| 9,155,392 B2 | 10/2015 | Baas | |
| 9,370,683 B2 | 6/2016 | Shauli | |
| 10,441,120 B1* | 10/2019 | Sgroi, Jr. | B25G 1/04 |
| 11,470,970 B1* | 10/2022 | Ai | A47C 7/004 |
| 11,519,446 B2* | 12/2022 | Liebelt | F16B 21/086 |
| 2012/0080572 A1* | 4/2012 | Lin | A47C 7/004 |
| | | | 248/188.7 |
| 2013/0062495 A1 | 3/2013 | Lin | |
| 2014/0251400 A1* | 9/2014 | Jin | E04H 15/60 |
| | | | 135/120.3 |
| 2022/0218110 A1* | 7/2022 | Wu | A47C 7/004 |
| 2023/0147575 A1* | 5/2023 | Tao | F16B 12/14 |
| | | | 248/188.7 |

FOREIGN PATENT DOCUMENTS

| | | | | |
|---|---|---|---|---|
| CN | 202681203 U | * | 1/2013 | ............ A47C 7/004 |
| CN | 202858441 U | * | 4/2013 | ............ A47C 7/004 |
| CN | 206499205 U | * | 9/2017 | ............ A47C 7/004 |
| CN | 207653878 U | * | 7/2018 | ............ A47C 7/004 |
| TW | M607172 U | | 9/2020 | |
| WO | 2004049871 A1 | | 6/2004 | |

OTHER PUBLICATIONS

PCT Written Opinion for corresponding PCT Patent Application No. PCT/CN2020/101834.
Decision to Grant a European Patent Pursuant to Article 97(1) EPC for corresponding European Patent Application No. 20844070.1.
Invitation Pursuant to Rule 62a(1) EPC for corresponding European Patent Application No. 20844070.1.
Amended Claims related to Invitation Pursuant to Rule 62a(1) EPC for corresponding European Patent Application No. 20844070.1.
Communication—Extended European Search Report for corresponding European Patent Application No. 20844070.1.
Amended Claims and Replacement Pages related to Communication—Extended European Search Report for corresponding European Patent Application No. 20844070.1.

* cited by examiner

CONNECTING STRUCTURE BETWEEN FEET AND CENTRAL MEMBER, FEET, CENTRAL MEMBER, CHASSIS AND CHAIR

CROSS REFERENCE TO RELATED APPLICATIONS

This is a national phase application of PCT Application No. PCT/CN2020/101834, filed Jul. 14, 2020, which claims priority to Chinese Patent Application No. 2019106665976, filed Jul. 23, 2019, the contents of which are incorporated herein by reference in their entireties.

TECHNICAL FIELD

The present disclosure relates to the technical field of seat connection structures, and in particular, to a connecting structure for connecting support feet and a central piece, a support foot, a central piece, a chassis and a seat.

BACKGROUND

In general, the existing chair feet are plastic parts or metal parts that are integrally formed. However, for the integrally formed chair feet, the molding process is more difficult. Specifically, each of the chair feet has large volume, complex structure, and the process of injection molding, casting and molding takes a long time, the mechanical cold working process is complicated, with a low production efficiency.

In view of the above technical problems, existing technologies have proposed corresponding solutions. For example, the Chinese utility model patent application with No. 201520047333.X discloses a detachable chair foot including a center piece and support feet, and the center piece has a center hole. The center piece is provided with a number of slots arrayed along the circumference of the axis, for mounting the feet, each of the slots is provided with a stopper; the connecting end of each the feet and the center piece is provided with buckle, the buckle is provided with a buckle tongue that is buckled with the stopper; the side where the stopper and the buckle are buckled is the buckle surface. The connecting end of the foot and the center piece also includes a round shaft protrusion, which is located at the lower end of the buckle. The end of the round shaft protrusion is an arc surface, the slot of the center piece is provided with a limit opening, and the shape of the limit opening matches the shape of the connecting portion. The slot of the center piece is provided with a rotating shaft groove under the stopper. The inner surface of the rotating shaft groove is a curved surface, and the curved surface matches the curvature of the round shaft protrusion. The chair foot is easy to disassemble and assemble, light in weight, low in cost and firm in structure.

SUMMARY

Technical Problem

The chair feet take up a lot of space, and the packaging and transportation costs are relatively high. The stress points between the feet and the center piece are located on the buckle tongue, and the buckle tongue itself has poor support strength, which easily causes damage to the chassis structure of the seat.

Technical Solutions

In view of the above problems, one of the objectives of the present disclosure is to provide a connecting structure for connecting the support feet and the central piece, the second objective is to provide the corresponding support foot and the central piece, and the third objective is to provide a chassis using the support feet and the central piece. The connecting structure for connecting the support feet and the center piece is stable in force, and no stress point with weak strength exists, so that the corresponding chassis and seat have reliable performance and long service life.

The technical solutions of the present disclosure to solve the above problems are as follows:

A connecting structure for connecting support feet and a center piece includes:
  center piece connecting portions provided on an outer circumference of the center piece, and configured to connect with the support feet;
  support foot connecting portions, each of which is provided at one end of each of the support feet, and configured to connect with the center piece;
  each of the central piece connecting portions is a groove, and the groove includes at least an outer opening facing an outside of the central piece, and a lower opening facing a lower side of the central piece;
  two side walls shared by the outer opening and the lower opening are respectively provided with rotation limit slots, and each of the rotation limit slots is provided with a foot connecting portion inlet at a side of a bottom surface facing the lower opening;
  the central piece connecting portion is provided with a clamping platform, and the clamping platform is arranged on an inner side wall opposite to the outer opening, the clamping platform includes a clamping surface at least partially facing an upper side of the central piece connecting portion;
  each of the support foot connecting portions is a raised block, and the block includes an upper surface, a lower surface, two side surfaces, and a front surface; wherein, when the center piece connecting portion and the support foot connecting portion are in an installed state, in the center piece connecting portion, the upper surface is adjacent to an opposite surface of the lower opening, the lower surface is located at the lower opening, the two side surfaces are respectively adjacent to the two side walls shared by the outer opening and the lower opening, and the front surface is adjacent to an opposite surface of the outer openings;
  the two side surfaces are respectively provided with rotation limit protrusions protruding outward, each of which is configured to engage with the rotation limit slot;
  the lower surface is provided with an abutting portion, for abutting and clamping with the clamping surface.

In a preferred embodiment, the rotation limit slot is composed of an entry channel and a rotation area; the rotation limit protrusion enters the entry channel through the foot connecting portion inlet until reaching the rotation area, and then the rotation limit protrusion rotates in the rotation area to complete an installation.

In a preferred embodiment, the two rotation limit protrusions have same shapes and dimensions, and correspondingly, the two rotation limit slots have same shapes and dimensions.

In a preferred embodiment, an outer circumference of the rotation limit protrusion is matched with an inner width of the rotation limit slot.

In a preferred embodiment, the rotation limit protrusion is a cylindrical protrusion, and correspondingly, the rotation area includes an inner wall with a partial arc-shape.

In a preferred embodiment, the upper surface is provided with a first hook, correspondingly, in the center piece connecting portion, a second hook is provided on the opposite surface of the lower opening; when the center piece connecting portion and the support foot connecting portion are in the installed state, the first hook and the second hook are hooked to each other.

In a preferred embodiment, the first hook is formed by integrating a hook portion and an elastic arm, the elastic arm is connected with the upper surface.

In a preferred embodiment, the first hook is provided in a through hole or a blind hole provided on the upper surface.

In a preferred embodiment, the front surface has a contour matching with a contour of the opposite surface of the outer opening, and in the center piece connecting portion, the front surface and the opposite surface of the outer opening are connected in a fit manner.

A support foot, one end thereof is provided with a support foot connection portion according to any solution above described.

In a preferred embodiment, the support foot connection portion has a contour matching with an outer contour of a corresponding part of the center piece.

A center piece, an outer periphery thereof is provided with a plurality of center piece connecting portions according to any solution described above.

In a preferred embodiment, a center hole is provided in a middle.

In a preferred embodiment, the plurality of the center piece connecting portions are evenly distributed on the outer periphery.

A chassis, wherein is formed by mounting a center piece according to any solution described above and a plurality of support feet according to any solution described above.

A seat, wherein adopts a chassis above

Beneficial Effect

In summary, the embodiments of the present disclosure have the following beneficial effects:
1) The connection structure for connecting the support feet and the center piece described in the embodiment of the present disclosure is based on two combined fixing structures, such as the rotation limit groove/rotation limit protrusion, and the clamping platform/abutting portion, and the force is stable and no weak stress points exist, such that the corresponding chassis and the seat can be reliable and have long service life.
2) Further, the connecting structure for connecting the supporting feet and the center piece described in the embodiments of the present disclosure is supplemented by the clamping structures, such as the first hook and the second hook, so that when the corresponding seat is in the lifted state, the supporting feet are not easy to fall, and can be easily transported as a whole.
3) Furthermore, the connecting structure for connecting the supporting feet and the center piece described in the embodiments of the present disclosure is supplemented by the bonding connection between the front surface and the opposite surface of the outer opening. When the chassis is under downward pressure, the bonding connection structure makes the front surface also participates in the pressure bearing structure, to prevent the abutting portion from deforming or even breaking due to excessive force, which further increases the strength and stability of the chassis.

DETAILED DESCRIPTION OF EMBODIMENTS

Figure 1:
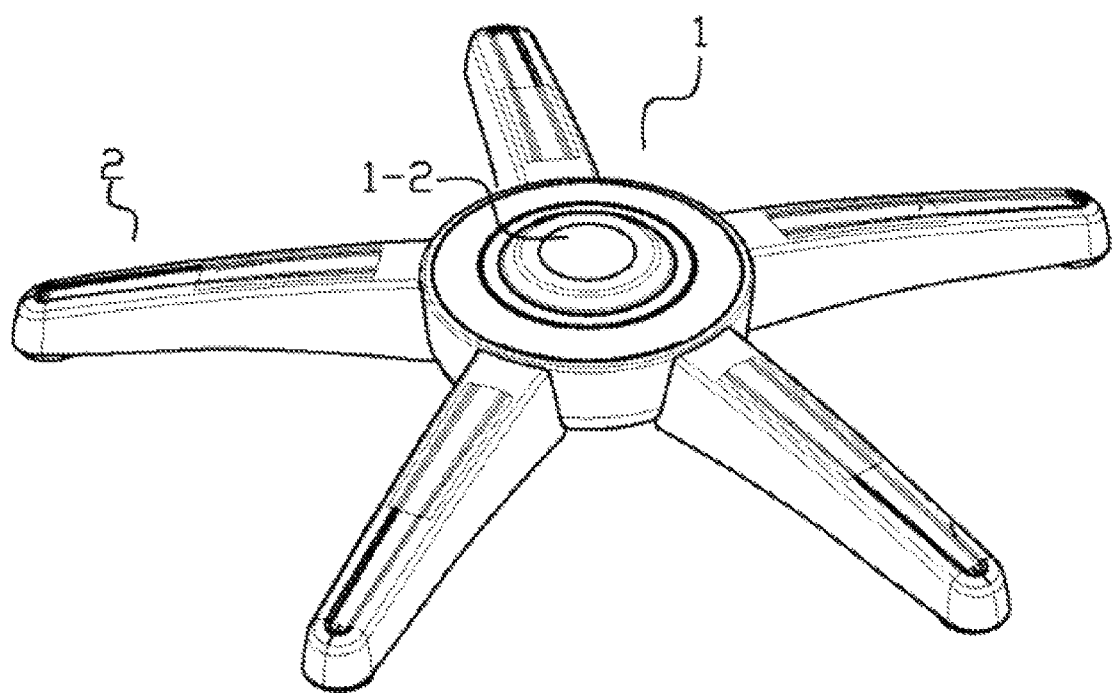
FIG. 1 is a schematic diagram showing a chassis structure according to an embodiment of the present disclosure.

The technical solutions in the embodiments of the present disclosure will be clearly and completely described below in combination with the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

In the description of the present disclosure, it should be understood that the terms "center", "longitudinal", "transverse", "length", "width", "thickness", "upper", "lower", "front", "back/rear", "left", "right", "vertical", "horizontal", "top", "bottom", "inner", "outer", "clockwise", "counterclockwise", "axial", "radial", "circumferential", or the like that indicate the orientation or positional relationship based on the orientation or positional relationship shown in the drawings, are only for the convenience of describing the present disclosure and simplifying the description, rather than indicating or implying that the device or element must have a specific orientation, or is constructed and operated in a specific orientation, and therefore cannot be understood as a limitation to the present disclosure.

In the present disclosure, unless otherwise clearly specified and limited, the terms "provided", "installed", "connected", "connecting", "fixed" and other terms should be understood in a broad sense. For example, it can be a fixed connection or a detachable connection; it can be a mechanical connection; it can be directly connected or indirectly connected through an intermediate medium. For those of ordinary skill in the art, the specific meanings of the above terms in the present disclosure can be understood according to specific circumstances.

In addition, the terms "first", "second", etc. are only used for descriptive purposes, and cannot be understood as indicating or implying relative importance or implicitly indicating the number of indicated technical features. Thus, the features defined with "first" and "second" may explicitly or implicitly include one or more of these features.

The present disclosure will be described in detail below with examples.

Figure 2:
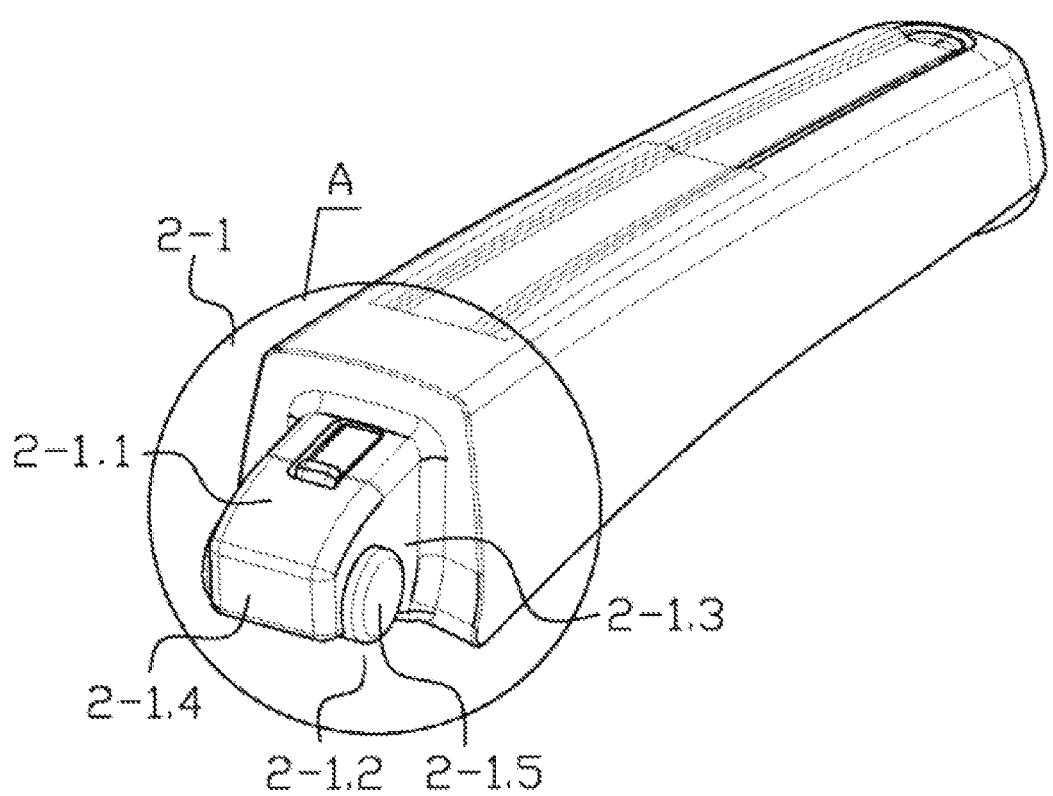
FIG. 2 is a schematic diagram showing a structure of a support foot according to an embodiment of the present disclosure.
Figure 3:
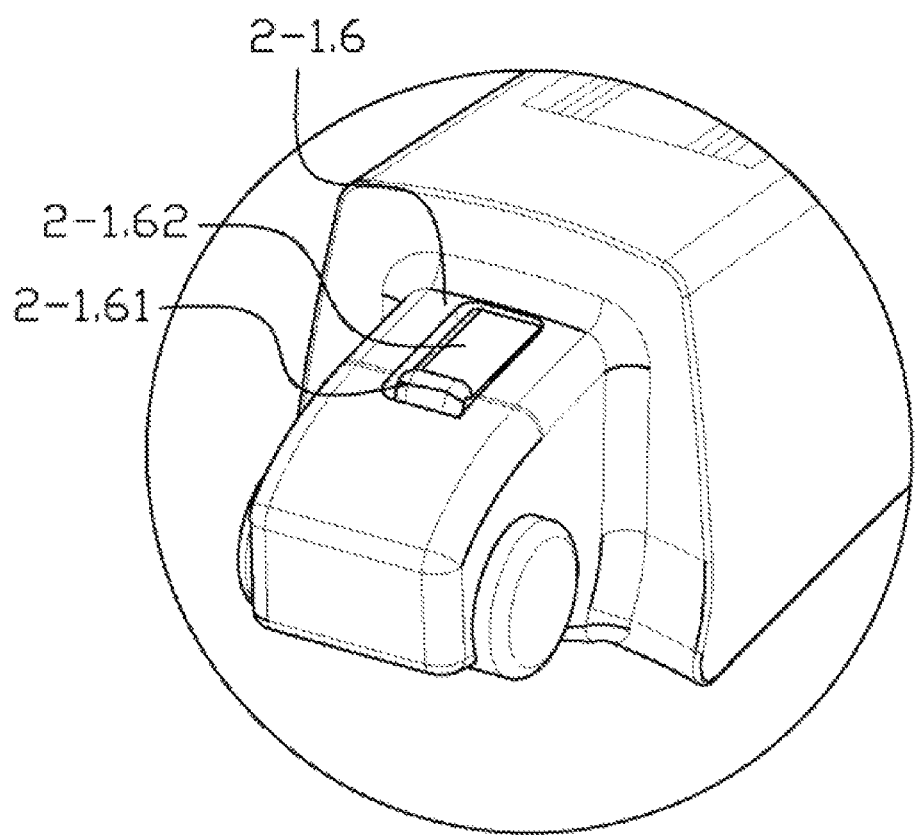
FIG. 3 is an enlarged view of part A in FIG. 2.
Figure 4:
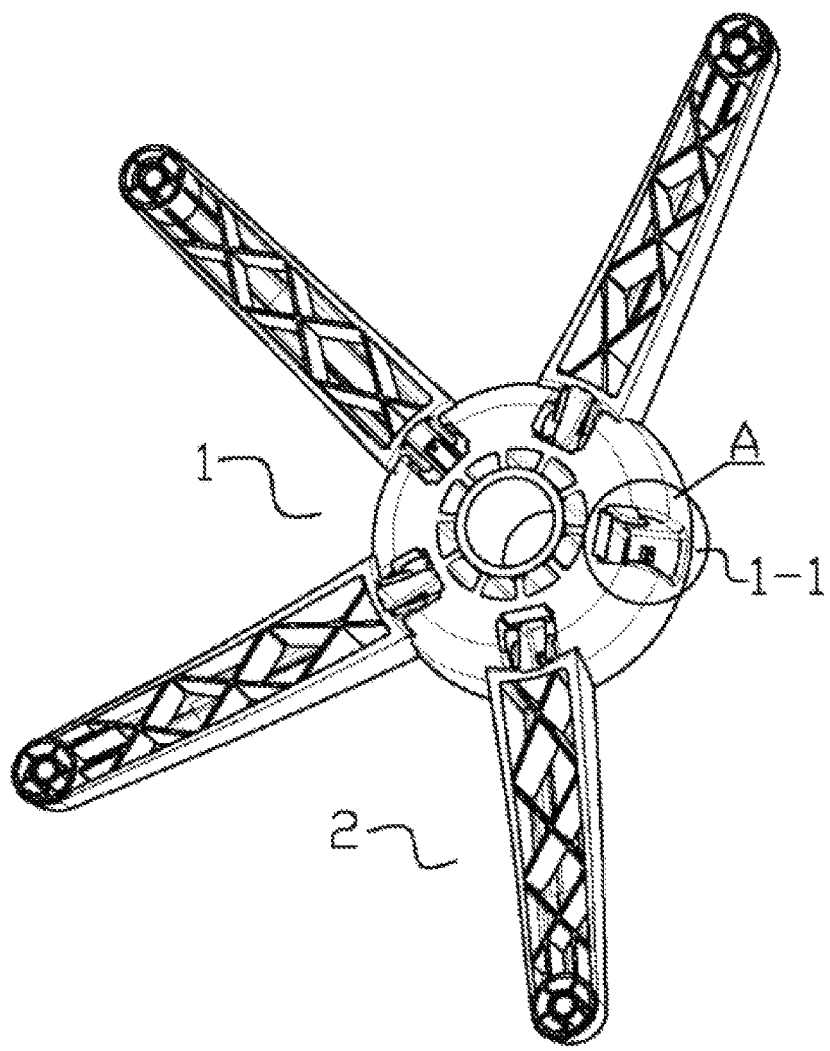
FIG. 4 is a schematic diagram showing a structure of the center piece connecting portion on the center piece.
Figure 5:
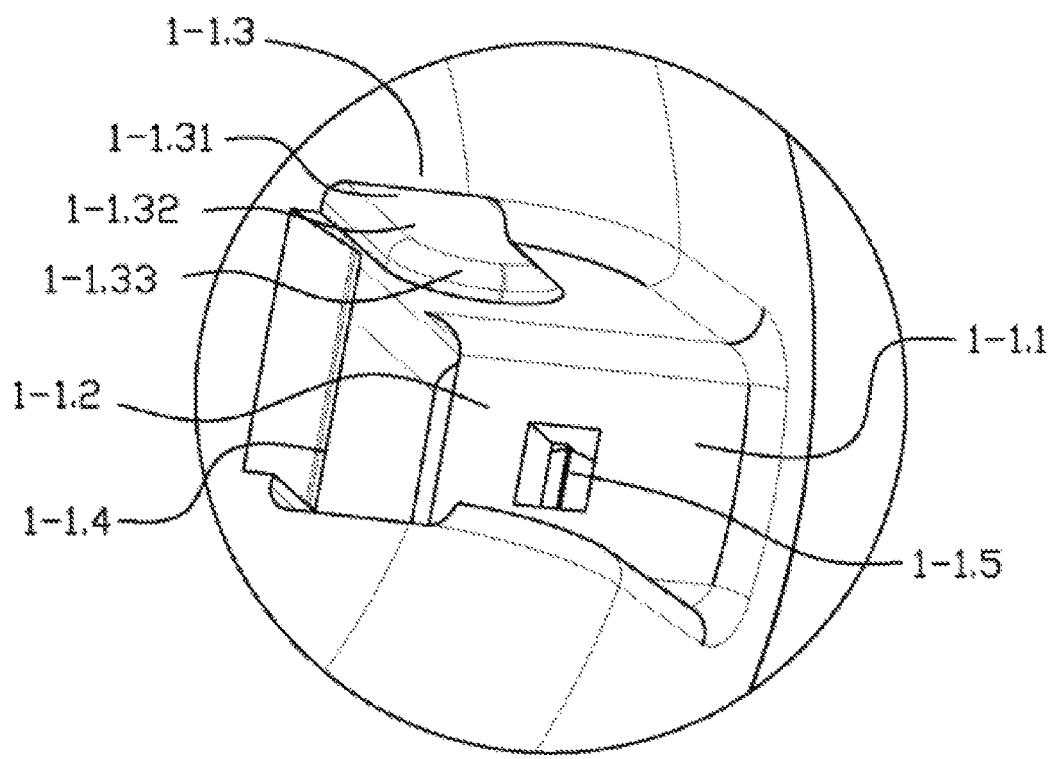
FIG. 5 is an enlarged view of part A in FIG. 4.
Figure 6:
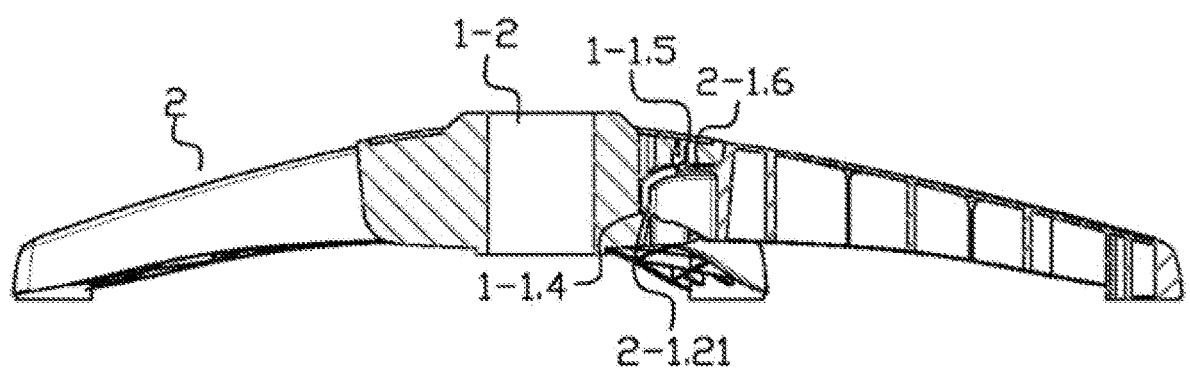
FIG. 6 is a longitudinal sectional view of a chassis.
In the figures,
1, center piece; 1-1, center piece connecting portion; 1-1.1, outer opening; 1-1.2, lower opening; 1-1.3, rotation limit slot; 1-1.31, support foot connecting portion inlet; 1-1.32, entry channel; 1-1.33, rotation area; 1-1.4, clamping platform; 1-1.5, second hook; 1-2, center hole; 2, support foot/feet; 2, support foot connecting portion; 2-1.1, upper surface; 2-1.2, lower surface; 2-1.21, abutting portion; 2-1.3, side surface; 2-1.4, front surface; 2-1.5, rotation limit protrusion; 2-1.6, first hook; 2-1.61, hook portion; 2-1.62, elastic arm.

With reference to FIGS. 1 to 6, the connecting structure for connecting the support feet and the center piece may be formed by connecting the center piece connecting portions 1-1 and the support foot connecting portions 2-1.

Wherein, each of the center piece connecting portion 1-1 may be a groove provided on the outer periphery of the center piece 1, and the groove may include an outer opening 1-1.1 facing the outer periphery of the center piece 1 and a lower opening 1-1.2 facing the lower side of the center piece 1. The two side walls shared by the outer opening 1-1.1 and the lower opening 1-1.2 may be respectively provided with rotation limit slots 1-1.3 of the same shape, and one side of the bottom surface of each of the rotation limit slot 1-1.3 facing the lower opening 1-1.2 may be provided with a support foot connecting portion inlet 1-1.31, above which a through entry channel 1-1.32 is provided, and above the entry channel 1-1.32, a rotation area 1-1.33 is provided.

Correspondingly, the support foot connecting portion 2-1 may be a convex block, including an upper surface 2-1.1, a lower surface 2-1.2, two side surfaces 2-1.3, a front surface 2-1.4, and an upper surface 2-1.1. The upper surface 2-1.1 may be adjacent to the opposite surface of the lower opening 1-1.2; the lower surface 2-1.2 is located at the lower opening 1-1.2; the two side surfaces 2-1.3 may be, respectively, adjacent to the two side walls shared by the outer opening 1-1.1 and the lower opening 1-1.2; the front surface 2-1.4 is adjacent to the opposite surface of the outer opening 1-1.1. The two side surfaces are respectively provided with cylindrical rotation limit protrusions 2-1.5 with the same shape and protruding outwards, configured to be connected with the rotation limit slot 1-1.3.

When snapped, each of the rotation limit protrusion 2-1.5 may enter the entry channel 1-1.32 through the support foot connection inlet 1-1.31, and each of the support feet 2 may be moved upwards until the rotation limit protrusion 2-1.5 reaches the rotation area 1-1.33, and then the rotation limit protrusion 2-1.5 may rotate in the rotation area 1-1.33 to complete the installation.

A clamping platform 1-1.4 may be also provided on the inner side wall of the central piece connecting portion 1-1 opposite to the outer opening 1-1.1, and the clamping platform 1-1.4 may be provided with a clamping surface facing the upper side of the central piece connecting portion 1-1.

Correspondingly, an abutting portion 2-1.21 may be provided on the lower surface 2-1.2 of the support foot connecting portion 2-1, for abutting and engaging with the clamping surface. When the rotation limit protrusion 2-1.5 rotates to the position where the installation is completed in the rotation area 1-1.33, the abutting portion 2-1.21 may be abutted against the clamping surface. In this way, support may be provided for the downward pressure through the abutment structure of the clamping platform 1-1.4/abutting portion 2-1.21.

In a preferred embodiment, the outer circumferential width of the rotation limit protrusion 2-1.5 may be the same as or slightly smaller than the inner width of the rotation limit slot 1-1.3, such that the rotation limit protrusion 2-1.5 can enter the rotation limit slot 1-1.3, and the rotation limit protrusion 2-1.5 can be restricted by the rotation limit slot 1-1.3 in a horizontal direction, to prevent the chair feet 2 from coming out.

In a preferred embodiment, the rotation area 1-1.33 may include an inner wall with a partial arc-shape, such that the rotation limit protrusion 2-1.5 can rotate within it without hindrance, and may be fully restricted by the arc-shaped inner side wall.

In another embodiment, the upper surface 2-1.1 of the support foot connecting portion 2-1 may be provided with a first hook 2-1.6. Correspondingly, the opposite surface of the lower opening 1-1.2 in the center piece connecting portion 1-1 may be provided with a second hook 1-1.5. When the center piece connecting portion 1-1 and the support foot connecting portion 2-1 are in the installed state, the first hook 2-1.6 and the second hook 1-1.5 may be hooked to each other. In this way, the support feet 2 can be difficult to fall down when the corresponding seat is lifted up, so that the seat can be in a suspended state without worrying about the support feet 2 falling, which facilitates the overall short-distance movement of the seat.

In a preferred embodiment, the first hook 2-1.6 may be provided in a through hole or a blind hole provided on the upper surface 2-1.1, and the first hook 2-1.6 may be integrally formed by a hook portion 2-1.61 and an elastic arm 2-1.62, and connected to the upper surface 2-1.1 through the elastic arm 2-1.62. in this way, when the first hook 2-1.6 passes through the second hook 1-1.5, the elastic arm 2-1.62 may be elastically deformed first, so that the first hook 2-1.6 and the second hook 1-1.5 is in contact, and then the elastic deformation is restored to make the first hook 2-1.6 and the second hook 1-1.5 snap into contact.

In a preferred embodiment, the contour of the front surface 2-1.4 may be adapted to the contour of the opposite surface of the outer opening 1-1.1. In the central piece connecting portion 1-1, the front surface 2-1.4 may be connected to the opposite surface of the outer opening 1-1.1 in a fitted manner. In this way, when the chassis is under downward pressure, the snapped connection structure can allow the front surface 2-1.4 also participate in the pressure-bearing structure, such that the abutting portion 2-1.21 can be prevented from deforming or even breaking due to excessive force, which further increases the strength and stability of the chassis.

In actual use, at first, the two rotation limit protrusions 2-1.5 on the support foot connecting portion 2-1 are inserted into the two rotation limit slots 1-1.3 in the center piece connecting portion 1-1, and each of the rotation limit protrusions 2-1.5 enters the rotation area 1-1.33 through the support foot connection inlet 1-1.31 and the entry channel 1-1.32 in order, and move the rotation limit protrusion 2-1.5 of the support foot 2 to rotate counterclockwise in the rotation area 1-1.33, such that the support foot 2 rotates to the position where the installation is completed. At this time, the abutting portion 2-1.21 may be snapped with the clamping surface.

Further, in the embodiment with the first hook 2-1.6 and the second hook 1-1.5, when the support foot 2 is rotated to the installed position, the first hook 2-1.6 and the second hook 1-1.5 may be hooked with each other.

Further, in an embodiment where the contour of the front surface 2-1.4 matches the contour of the opposite surface of the outer opening 1-1.1, when the support foot 2 is rotated to the installed position, the front surface 2-1.4 and the opposite surface of the outer opening 1-1.1 may be connected in a fitted manner.

Corresponding to the support foot 2 and the central piece 1, one end of the support foot 2 may be provided with the support foot connecting portion 2-1 described in the technical solution of any of the above embodiments. The outer periphery of the central piece 1 may be evenly provided with a plurality of the central piece connecting portion 1-1 described in the technical solution of any of the above embodiments.

It is easy to imagine in the above technical solution, the other end of the support foot 2 may be provided with a roller, and the middle of the center piece 1 may be provided with a central hole 1-2 for inserting the seat air rod.

In a preferred embodiment, the contour of the surface where the support foot connecting portion 2-1 is located matches the outer contour of the corresponding part of the center piece 1. In this manner, the seat foot 2 can be prevented from swinging relative to the center piece 1 when the chassis rotates or moves.

The corresponding chassis may be formed by splicing and installing the support feet 2 and the center piece 1 described in the technical solution of any of the above embodiments.

The corresponding seat adopts the chassis described in the technical solution of any of the above embodiments.

Those skilled in the art should understand that the above description and the embodiments of the present disclosure shown in the accompanying drawings are only examples and do not limit the present disclosure. The objects of the present disclosure have been fully and effectively realized. The functions and structural principles of the present disclosure have been shown and explained in the embodiments. Without departing from the principles, the implementation of the present disclosure may have any variants or modification.

What is claimed is:

1. A connecting structure for connecting support feet and a center piece, comprising:
   center piece connecting portions provided on an outer circumference of the center piece, and configured to connect with the support feet;
   support foot connecting portions, each of which being provided at one end of each of the support feet, and configured to connect with the center piece;
   wherein:
   each of the central piece connecting portions is a groove, and the groove comprises at least an outer opening facing an outside of the central piece, and a lower opening facing a lower side of the central piece;
   two side walls of the outer opening and the lower opening are respectively provided with rotation limit slots, and a bottom, facing the lower opening, of each of the rotation limit slots is provided with a foot connecting portion inlet;
   the central piece connecting portion is provided with a clamping platform, and the clamping platform is arranged on an inner side wall opposite to the outer opening, the clamping platform comprises a clamping surface at least partially facing an upper side of the central piece connecting portion;
   each of the support foot connecting portions is a convex block, and the block comprises an upper surface, a lower surface, two side surfaces, and a front surface; wherein, when the center piece connecting portion and the support foot connecting portion are in an installed state, in the center piece connecting portion, the upper surface is adjacent to an opposite surface of the lower opening, the lower surface is located at the lower opening, the two side surfaces are respectively adjacent to the two side walls of the outer opening and the lower opening, and the front surface is adjacent to an opposite surface of the outer openings;
   the two side surfaces are respectively provided with rotation limit protrusions protruding outward, each of which is configured to engage with the rotation limit slot;
   the lower surface is provided with an abutting portion, for abutting and clamping with the clamping surface;
   the upper surface is provided with a first hook, correspondingly, in the center piece connecting portion, a second hook is provided on the opposite surface of the lower opening; when the center piece connecting portion and the support foot connecting portion are in the installed state, the first hook and the second hook are hooked to each other;
   the first hook is formed by integrating a hook portion and an elastic arm, the elastic arm is connected with the upper surface;
   the first hook is provided in a through hole or a blind hole provided on the upper surface.

2. The connecting structure for connecting support feet and a center piece according to claim 1, wherein: the rotation limit slot is composed of an entry channel and a rotation area; the rotation limit protrusion enters the entry channel through the foot connecting portion inlet until reaching the rotation area, and then the rotation limit protrusion rotates in the rotation area to complete an installation.

3. The connecting structure for connecting support feet and a center piece according to claim 2, wherein: the two rotation limit protrusions have same shapes and dimensions, and correspondingly, the two rotation limit slots have same shapes and dimensions.

4. The connection structure for connecting support feet and a center piece according to claim 3, wherein: an outer circumference of the rotation limit protrusion is matched with an inner width of the rotation limit slot.

5. The connecting structure for connecting support feet and a center piece according to claim 3, wherein: the rotation limit protrusion is a cylindrical protrusion, and correspondingly, the rotation area comprises an inner wall with a partial arc-shape.

6. The connecting structure for connecting support feet and a center piece according to claim 1, wherein: the front surface has a contour matching with a contour of the opposite surface of the outer opening, and in the center piece connecting portion, the front surface and the opposite surface of the outer opening are connected in a fit manner.

7. A support foot, wherein one end thereof being provided with a support foot connection portion according to claim 1.

8. The support foot according to claim 7, wherein: the support foot connection portion has a contour matching with an outer contour of a corresponding part of the center piece.

9. A center piece, wherein: an outer periphery thereof is provided with a plurality of center piece connecting portions according to claim 1.

10. The center piece according to claim 9, wherein a center hole is provided in a middle.

11. The center piece according to claim 9, wherein: the plurality of the center piece connecting portions are evenly distributed on the outer periphery.

* * * * *